United States Patent [19]
Limaye

[11] Patent Number: 5,770,326
[45] Date of Patent: Jun. 23, 1998

US005770326A

[54] MONOLITHIC MASS AND ENERGY TRANSFER CELL

[76] Inventor: Santosh Y. Limaye, 3009 E. Alvera Cir., Salt Lake City, Utah 84117

[21] Appl. No.: 771,513

[22] Filed: Dec. 23, 1996

[51] Int. Cl.[6] .............................. H01M 8/10; H01M 8/12; C25B 11/20; C25B 13/02
[52] U.S. Cl. ................................. 429/30; 429/31; 429/32; 429/33; 429/40; 204/258; 204/265; 204/266
[58] Field of Search ................................. 429/30, 31, 32, 429/33, 40; 204/258, 265, 266

[56] References Cited

U.S. PATENT DOCUMENTS

| | | | |
|---|---|---|---|
| 4,366,211 | 12/1982 | Pollack | 429/38 |
| 4,396,480 | 8/1983 | Hegedus et al. | 429/33 |
| 4,413,041 | 11/1983 | Hegedus | 429/33 |
| 4,454,207 | 6/1984 | Fraioli et al. | 429/17 |
| 4,463,065 | 7/1984 | Hegedus et al. | 429/33 |
| 4,476,196 | 10/1984 | Poeppel et al. | 429/32 |
| 4,476,198 | 10/1984 | Ackerman et al. | 429/32 |
| 4,515,871 | 5/1985 | Shirogami et al. | 429/34 |
| 4,664,987 | 5/1987 | Isenberg | 429/31 |
| 4,857,420 | 8/1989 | Maricle et al. | 429/30 |
| 4,877,506 | 10/1989 | Fee et al. | 204/242 |
| 4,913,982 | 4/1990 | Kotchick et al. | 429/12 |
| 4,950,562 | 8/1990 | Yoshida et al. | 429/32 |
| 5,021,137 | 6/1991 | Joshi et al. | 204/242 |
| 5,034,288 | 7/1991 | Bossel | 429/32 |
| 5,049,459 | 9/1991 | Akagi | 429/33 |
| 5,069,987 | 12/1991 | Gordon | 429/31 |
| 5,071,717 | 12/1991 | Bushnell | 429/13 |
| 5,145,754 | 9/1992 | Misawa et al. | 429/32 |
| 5,162,167 | 11/1992 | Minh et al. | 429/30 |
| 5,208,115 | 5/1993 | Akagi | 429/26 |
| 5,212,023 | 5/1993 | Diethelm | 429/26 |
| 5,256,499 | 10/1993 | Minh et al. | 429/33 |
| 5,273,837 | 12/1993 | Aitken et al. | 429/30 |
| 5,298,138 | 3/1994 | Nachles et al. | 204/267 |
| 5,312,700 | 5/1994 | Ishida | 429/30 |
| 5,342,705 | 8/1994 | Minh et al. | 429/32 |
| 5,356,728 | 10/1994 | Balachandran et al. | 429/8 |
| 5,368,951 | 11/1994 | Shiratori et al. | 429/30 |
| 5,496,655 | 3/1996 | Lessing | 429/34 |
| 5,587,251 | 12/1996 | Spach et al. | 429/33 |

OTHER PUBLICATIONS

Cecily Romero, John Wright, "The Value and Manufacturing Costs of Planar Solid Oxide Fuel Cell Stacks", GRI–96/0210, Jul. 1996, pp. 3–8, Gas Research Institute.

Primary Examiner—Kathryn L. Gorgos
Assistant Examiner—Chrisman D. Carroll
Attorney, Agent, or Firm—Joy L. Bryant

[57] ABSTRACT

A monolithic mass and energy transfer cell is provided. The cell comprises a monolithic ionically conductive core. The core has an outer surface including a first entrance surface and a first exit surface, which is spaced apart from the first entrance surface. A first set of passages are positioned between the first entrance surface and the first exit surface. The outer surface also includes a second entrance surface and a second exit surface, spaced apart from the second entrance surface. A second set of passages are positioned therebetween. The first set of passages are in a non-parallel relationship with the second set of passages. A first porous, electrically conductive coating is disposed within the first set of passages and a second porous, electrically conductive coating is disposed within the second set of passages. An external electric circuit is in electrical contact with the monolithic ionically conductive core. The monolithic mass and energy transfer cell of the present invention may be used for solid oxide fuel cells, solid electrolyte oxygen pumps and cross-flow electrochemical reactor cells.

20 Claims, 5 Drawing Sheets

MONOLITHIC MASS AND ENERGY TRANSFER CELL

FIELD OF THE INVENTION

The present invention relates to mass and energy transfer cells. In particular, it relates to monolithic mass and energy transfer cells comprising a monolithic ionically conductive core and an external electric circuit.

BACKGROUND OF THE INVENTION

Solid oxide fuel cells (SOFCs), solid electrolyte oxygen pumps and cross-flow electrochemical reactor cells operate using very similar concepts. Each of these devices involve the use of an oxygen-conducting solid electrolyte, which allows for oxygen ion conductivity and/or electron conductivity.

SOFCs are used to generate electricity from fuel gas and air and typically have three active components: an anode, or fuel electrode; a cathode, or oxygen electrode; and the electrolyte, which is located between the anode and the cathode. Each of these components are composed of solid oxides. In addition, an electrically conducting interconnect provides for electrical contact between the cells and gas contact at both the anode and the cathode. In the typical operation of a SOFC, an oxidant, air, is supplied to the cathode. The oxygen dissociatively adsorbs at the cathode surface, migrates to the ionically conductive electrolyte, ionizes, and the resulting oxygen ions migrate through the electrolyte. This migration across the ionically conducting electrolyte is driven by an oxygen ion concentration gradient. At the anode, a fuel such as hydrogen gas, reacts with the oxygen ions to form water. The electrons are released and transported through the electrically conducting anode, through the interconnect and on to the cathode of the neighboring cell to repeat the process. This reaction produces energy, much of which manifests itself as an increase in the electrochemical potential of the system. Electrons released at the anode flow through a series of cells and ultimately through a load and back to the first cathode where they once again begin their cycle. The external load is the sink for the electrochemical potential gained across the stack of cells. A portion of the energy released in the electrochemical reaction manifests itself as heat due to losses from the electrical resistance of the components, interfacial resistance phenomena, and entropy increase.

One of the most difficult problems facing SOFC developers has been finding compatible materials for all the functions of the fuel cell. Since the material properties required for the anode, electrolyte and cathode are quite different, they have very different compositions and must be tightly bonded together to maximize electrical contact. Thus, the coefficients of thermal expansion must be well matched. The electrolyte must be stable in both oxidizing and reducing environments. It must allow for the passage of oxygen ions but have minimal electrical conductivity to avoid short circuiting. It must be impermeable to gas transport and must exhibit sufficient mechanical integrity. Yttria-stabilized zirconia (YSZ) has been the material of choice. The mechanism of oxygen ion diffusion through YSZ is via oxygen vacancies, created by the substitution of yttria ions in the zirconia lattice, where zirconia is in the +4 oxidation state. However, YSZ's conductivity is only acceptable at high operating temperatures (1000° C.). The anode provides a catalytically active surface on which the hydrogen can react with the oxygen ions diffusing across from the cathode side. It must be a good electrical conductor to channel the electrons produced in the reaction to the interconnect. High porosity is desired to enhance the transport of the hydrogen gas through the anode to the electrolyte interface and to allow removal of the water by-product from the reaction. Since the anode provides a reducing environment, metals have been found to be suitable anode materials, an example of which is nickel dispersed throughout a YSZ matrix. This allows for close matching between the thermal expansion coefficient of the anode and the YSZ electrolyte. The cathode must be stable in oxidizing conditions at the fuel cell operating temperatures. Thus, only noble metals and electrically conducting ceramic oxides such as doped lanthanum manganite can be considered as suitable. As with the anode, the cathode must be porous to facilitate transport of oxygen gas to the electrolyte/cathode interface. In addition, a material is needed to provide electrical contact between the individual cells so they may be connected together in series to produce a suitable voltage. The interconnects must be stable, electrically conducting at high temperature in fuel and air environments, and be impermeable to gases so that the fuel chamber of one cell remains isolated from the air chamber of the adjacent cell. The interconnect may be constructed of ceramic oxides or metals. Interconnects are often machined or corrugated to provide the gas channels, although in some designs, the gas channels are provided through the electrode porosity or by corrugations in the fuel cell trilayer. In other designs, a perovskite-type interconnect is used. In reduced temperature SOFCs, more economical metal interconnects can be used.

Solid electrolyte oxygen pumps are of similar construction to SOFCs but have a different function. Solid electrolyte oxygen pumps are used for separating oxygen from a mixture of oxygen and another gaseous component to yield pure oxygen, rather than electrons. Fee et al. (U.S. Pat. No. 4,877,506) disclose a monolithic solid electrolyte oxygen pump which may be utilized as a portable oxygen generating device. The oxygen pump includes a thin elongated solid electrolyte wall preferably comprised of yttria stabilized zirconia which is disposed between a pair of electrodes which are preferably comprised of porous lanthanum manganites, such as $LaMnO_3$, and further includes connecting walls of dense lanthanum manganites. The oxygen pump is comprised of a plurality of interconnecting cells and chambers on opposite sides of the cells to respectively provide for a source of air and the collection of oxygen. Each cell thus includes a solid electrolyte wall and a pair of the electrodes on opposite sides of the electrolyte with an interconnecting wall disposed between and coupled to adjacent cells. A source of DC voltage is applied to the electrodes such that oxygen is ionized at the first electrode, travels through the electrolyte, and is converted to oxygen gas at the second electrode. Fee et al. teach that the monolithic fuel cell core is formed solely or entirely of the active cathode, anode, electrolyte and interconnect materials. Each active material is in the form of a thin layer, with the layers integrally bonded or fused together to form the monolithic core. The fabrication techniques used to form these monoliths include tape casting, sequential tape casting, dip coating, and calendering or row-forming. Each of the resulting monoliths, regardless of the fabrication techniques, include an anode, cathode, electrolyte and interconnect.

Cross-flow electrochemical reactors are useful for controlling partial oxidation reactions of organic compounds. Balachandran et al. (U.S. Pat. No. 5,356,728) disclose a cross-flow electrochemical reactor cell containing oxygen permeable materials which have both electron conductivity and oxygen ion conductivity. These cross-flow reactor cells have oxygen permeable monolithic cores to control and facilitate transport of oxygen from an oxygen-containing gas stream to oxidation reactions of an organic compound in another gas stream. The reactor cell comprises either a hollow ceramic blade positioned across a gas stream flow or a stack of crossed hollow ceramic blades containing a channel or channels for flow of gas streams. Each channel has at least one channel wall disposed between a channel and a portion of an outer surface of the ceramic blade or a common wall with adjacent blades in a stack comprising a gas-impervious mixed metal oxide material of a perovskite structure having electron conductivity and oxygen ion conductivity. The oxidation reactions conducted in these cross-flow reactors do not require an external source of electrical potential or any external electric circuit for oxidation to proceed.

Rather these reactors operate on a diffusion principle and, as a result they may not be used as an oxygen pump or as a SOFC. The oxygen flows through the oxygen permeable monolithic core due to the concentration gradient across the membrane. On the air side of the membrane, electrons are removed and a positive charge builds up. The electrons migrate back through the membrane to the air side where they re-ionize the oxygen in the air. Since there is no external circuit, there is no way to harness the electrons generated by the reaction nor is there any way to control the transport of oxygen ions through the monolithic core by using an external electrical potential or circuit.

SUMMARY OF THE INVENTION

Accordingly, it is an object of the present invention to provide a multi-purpose monolithic mass and energy transfer cell which requires an external electric circuit and may be used for solid oxide fuel cells, oxygen pumps and electrochemical reactor cells.

Another object of the invention is to provide a monolithic mass and energy transfer cell which does not require bonding or fusing of the active layers.

Another object of the invention is to provide a monolithic mass and energy transfer cell which has a monolithic ionically conductive core and an external electric circuit.

Another object of the invention is to provide a monolithic mass and energy trnasfer cell which has interlocking channels attached to the outer surface of the monolithic ionically conductive core wherein the interlocking channels are used to connect a plurality of cells to form an array.

Other objects and advantages of the present invention will become more obvious hereinafter in the specification and drawings.

In accordance with the present invention, a monolithic mass and energy transfer cell is provided. The cell comprises a monolithic ionically conductive core and an external electric circuit in electrical contact with the monolithic ionically conductive core. The core has an outer surface including a first entrance surface and a first exit surface, which is spaced apart from the first entrance surface. A first set of passages are positioned between the first entrance surface and the first exit surface. The outer surface also includes a second entrance surface and a second exit surface, which is spaced apart from the second entrance surface. A second set of passages are located between the second entrance surface and the second exit surface. The first set of passages are in a non-parallel relationship with the second set of passages.

A first porous, electrically conductive coating is disposed within the first set of passages and a second porous, electrically conductive coating is disposed within the second set of passages. The monolithic mass and energy transfer cell further comprises, a first electrically conductive material, disposed within and preferably, protruding from the first set of coated, passages and a second electrically conductive material disposed within and preferably, protruding from the second set of coated, passages. An external electric circuit is attached to the monolithic ionically conductive core.

Preferably, a first interlocking channel and a second interlocking channel protrude from the outer surface of the monolithic ionically conductive core and serves as a support for a first electrically conductive perforated plate and a second electrically conductive perforated plate. Each electrically conductive perforated plate is supported by the interlocking channel such that the first electrically conductive perforated plate is in electrical contact with the first electrically conductive material and the second electrically conductive perforated plate is in electrical contact with the second electrically conductive material. The first electrically conductive perforated plate does not touch or come into electrical contact with the second electrically conductive perforated plate or shorting occurs.

The monolithic mass and energy transfer cell of the present invention offers several advantages. The monolithic mass and energy transfer cell is easily made in any shape depending on the mold used. Moreover, the electrical circuitry of the cell is easily modified to meet the needs of the application. The structure of the core of the device is kept constant. The composition of the core material may be any ionically conductive material known to those skilled in the art but preferably is an oxygen ion conductive ceramic. Because of the consistency in the physical structure of the core, one monolithic ionically conductive core is used for multiple applications such as SOFCs, solid electrolyte oxygen pumps or cross-flow electrochemical cells. This alone provides a tremendous advantage over having to specially design whole new systems for each specific application.

DETAILED DESCRIPTION OF THE INVENTION

The monolithic mass and energy transfer cell of the present invention is of a unique structure. Unlike other known monoliths, the monolithic cell of the present invention does not require any bonding between the layers.

Indeed, the monolithic cell is fabricated as a single unit using any one-step fabrication process known to those skilled in the art wherein all of the passageways are formed at the same time. Examples of such processes include but are not limited to: injection molding, gel casting, slurry setting, and hot pressing. The advantage to having a true monolithic structure is that the thermal mismatch between the layers is greatly reduced.

In a preferred embodiment, the monolithic mass and energy transfer cell is fabricated in such a way that a first interlocking channel and a second interlocking channel protrude from the outer surface of the monolithic ionically conductive core. The interlocking channels serve two purposes: 1) they allow any number of mass and energy transfer cells to be locked together to form an array; and 2) they serve as a support for the electrically conductive perforated plates.

Figure 1:
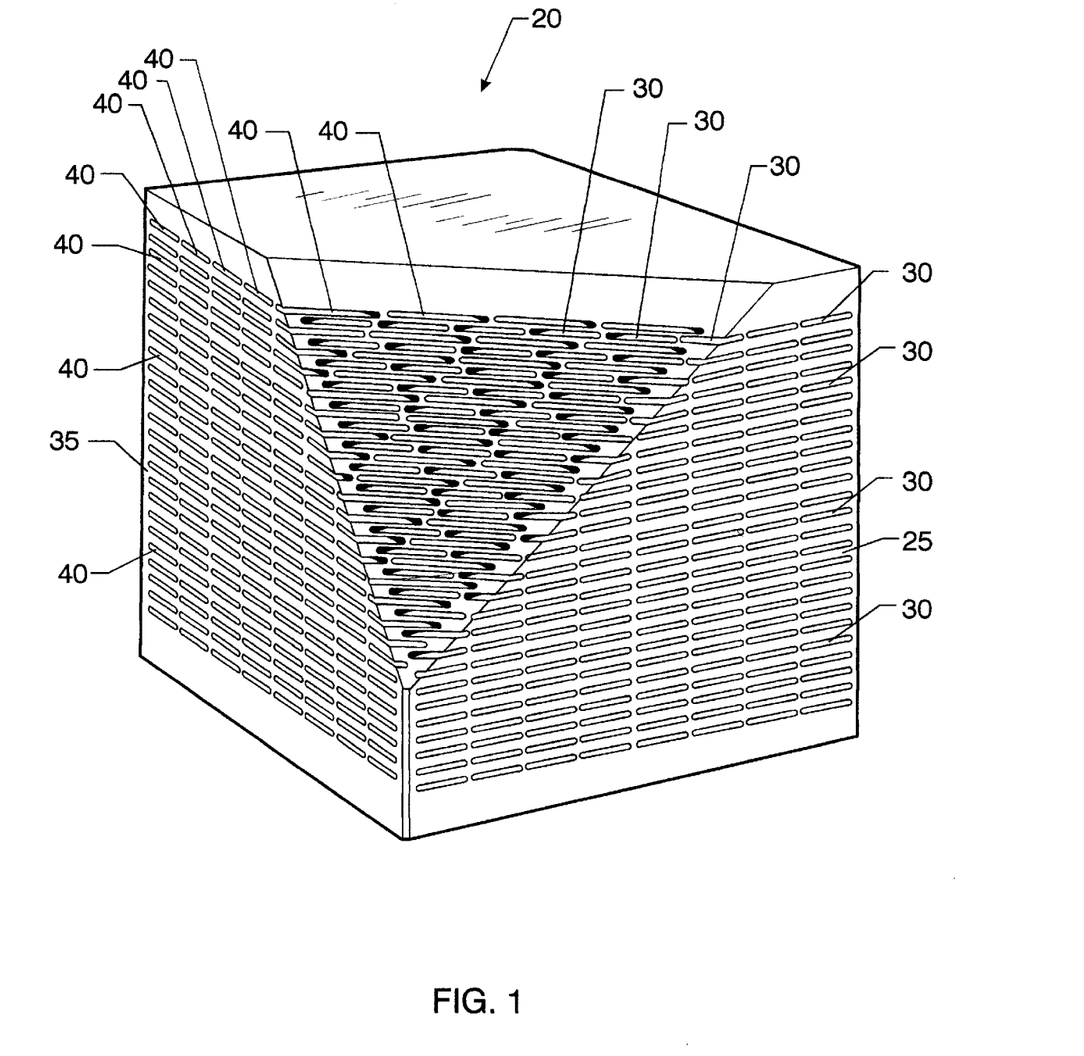
FIG. 1 is a perspective view with a cutaway section showing the interior alternating rows of one embodiment of the monolithic ionically conductive core of the present invention.
Figure 2:
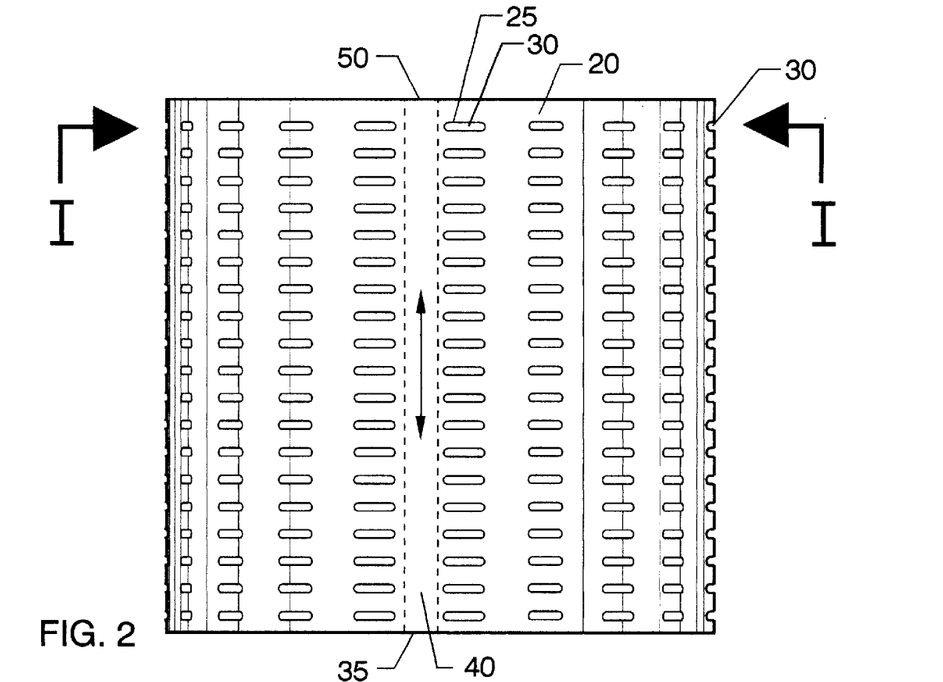
FIG. 2 is a side view of a cylindrical shaped monolithic ionically conductive core.
Figure 3:
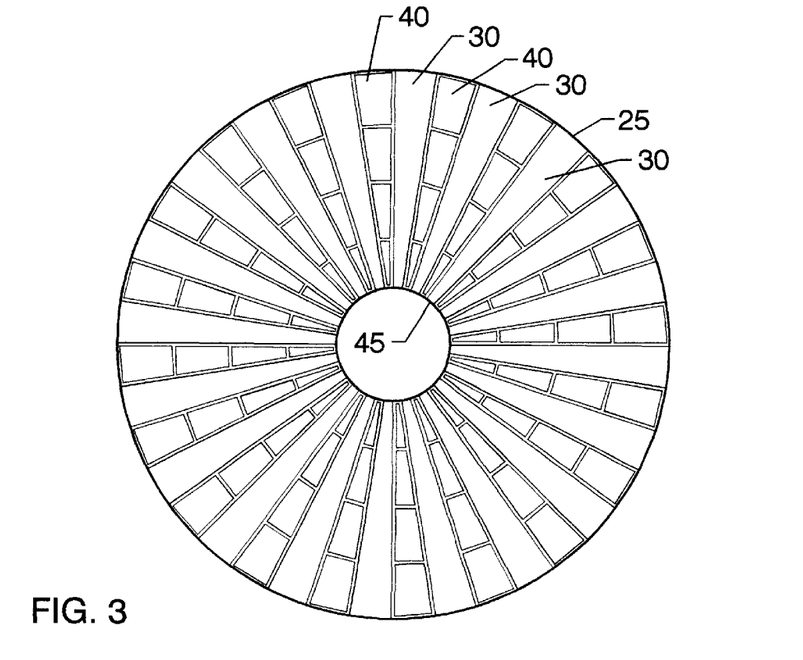
FIG. 3 is a section view along section I—I of FIG. 2.

Referring to the drawings, FIG. 1 shows the monolithic ionically conductive core 20 of the present invention. This monolithic ionically conductive core is prepared by such fabrication techniques as injection molding, gel casting, slurry setting, hot pressing or any other technique known to those skilled in the art wherein two sets of passages are formed at the same time. Not only do these techniques afford a true monolith, as opposed to a laminate, but these techniques offer the versatility to design a monolithic ionically conductive core in a specific shape depending on the final use. The shape of the monolithic ionically conductive core shown in FIG. 1 is cubic. However, the monolithic ionically conductive core could also have a cylindrical shape as shown in FIGS. 2 and 3.

The monolithic ionically conductive core is prepared from any ionically conductive material known to those skilled in the art. An example of an ionically conductive polymeric material is NAFION, a perflourinated ionomer, which is available from DuPont. Preferably, the ionically conductive material is an oxygen ion conductive ceramic selected from the group consisting of: yttria-doped zirconia; rare earth-doped cerium oxide; and rare earth-doped bismuth oxide. In particular, yttria-doped zirconia is the most preferred ceramic.

Figure 4:
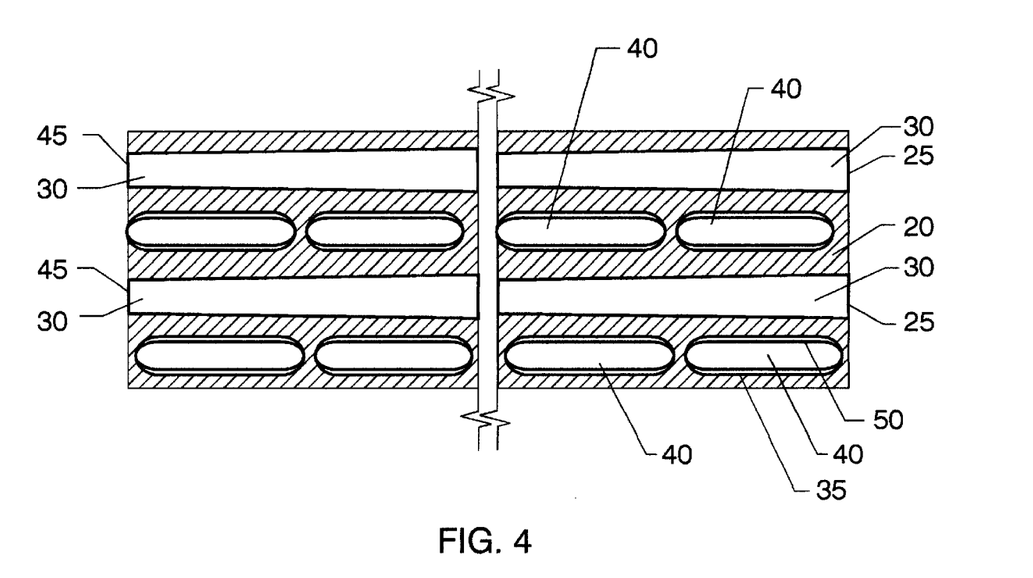
FIG. 4 is a cross-section of the monolithic ionically conductive core showing tapered passages.

Referring to FIG. 1, the monolithic ionically conductive core 20 has an outer surface including a first entrance surface 25 and a first exit surface (not shown), which is spaced apart from the entrance surface. A first set of passages 30, made up of a plurality of single passages arranged in an array, are positioned between the first entrance surface 25 and the first exit surface (not shown) and extends across, down and through the monolithic ionically conductive core. The outer surface also includes a second entrance surface 35 and a second exit surface (not shown), spaced apart from the second entrance surface, a second set of passages 40 are located therebetween. The second set of passages 40 are also made-up of a plurality of single passages arranged in an array which extends across, down and through the monolithic ionically conductive core 20. The first set of passages are in a non-parallel relationship with the second set of passages. This is shown in the cutaway section of FIG. 1. For purposes of the present invention, non-parallel may be further defined as orthogonal, hexagonal and radial. Preferably, the relationship is orthogonal. The first set and the second set of passages preferably have a shape selected from the group consisting of: rectangular, square, triangular, circular and elliptical. Most preferably, the first set and the second set of passages have a rectangular shape. Moreover, the shape of the first set and the second set of passages may be tapered. Tapered is defined as the passage maintaining its width but changing in height as it extends from the entrance surface to the exit surface. One preferred embodiment is shown in FIG. 4, where the first set of passages 30 are wide at the first entrance surface 25 and narrow at the first exit surface 45. The second set of passages 40 are also wide at the second entrance surface 35 and narrow at the second exit surface 50. The tapered passage is more easily seen in FIG. 3, which is a cross section of FIG. 2 taken along section I—I. The first set of passages 30 are radial with respect to the center of the cylinder. The first entrance surface 25 follows the outer radius of the cylinder where the first exit surface 45 follows the inner radius of the cylinder. Since the inner radius is smaller than the outer radius, tapering of the passages is well defined. The second set of passages 40 are lateral in the cylinder and are indicated by the hidden lines of FIG. 2. The passages have openings which are interchangeable. For example, the second entrance surface 35 is shown at the bottom but could be at the top of the cylinder. The second exit surface 50 is at the opposite end. The thickness of the passage walls is kept constant, preferably at 0.010 inches or less.

A first and second porous, electrically conductive coating is disposed within the first and second sets of passages, respectively. This coating enhances operability of the mass and energy transfer cell. The coating lines the interior of each passage but does not have to extend to the outer surface of the monolithic ionically conductive core. However, the coating may cover the outer surface of the monolithic ionically conductive core to enhance electrical conductivity. If the coating is extended to the outer surface of the monolithic ionically conductive core, necessary precautions should be taken so the first coating does not come into contact with the second coating causing the cell to short-out. The first set of passages are coated with a first porous, electrically conductive coating and the second set of passages are coated with a second porous, electrically conductive coating. The composition of the first and second porous, electrically conductive coatings may be the same, such as strontium-doped lanthanum manganite (for an oxygen pump), or different, depending on the final application of the cell. As a preferred embodiment, the first porous electrically conductive coating is comprised of: nickel-dispersed doped-zirconia, platinum, palladium or gold. Most preferably, the first porous, electrically conductive coating is comprised of nickel-dispersed doped-zirconia. The second porous, electrically conductive coating is preferably comprised of a material selected from the group consisting of: lanthanum manganite, strontium-doped lanthanum manganite, and a dispersed noble metal. As a most preferred embodiment, the second porous, electrically conductive coating is comprised of strontium-doped lanthanum manganite. Whatever the composition of these porous, electrically conductive coatings, they must be compatible with or match the electrically conductive materials which are disposed within the passages.

Figure 5:
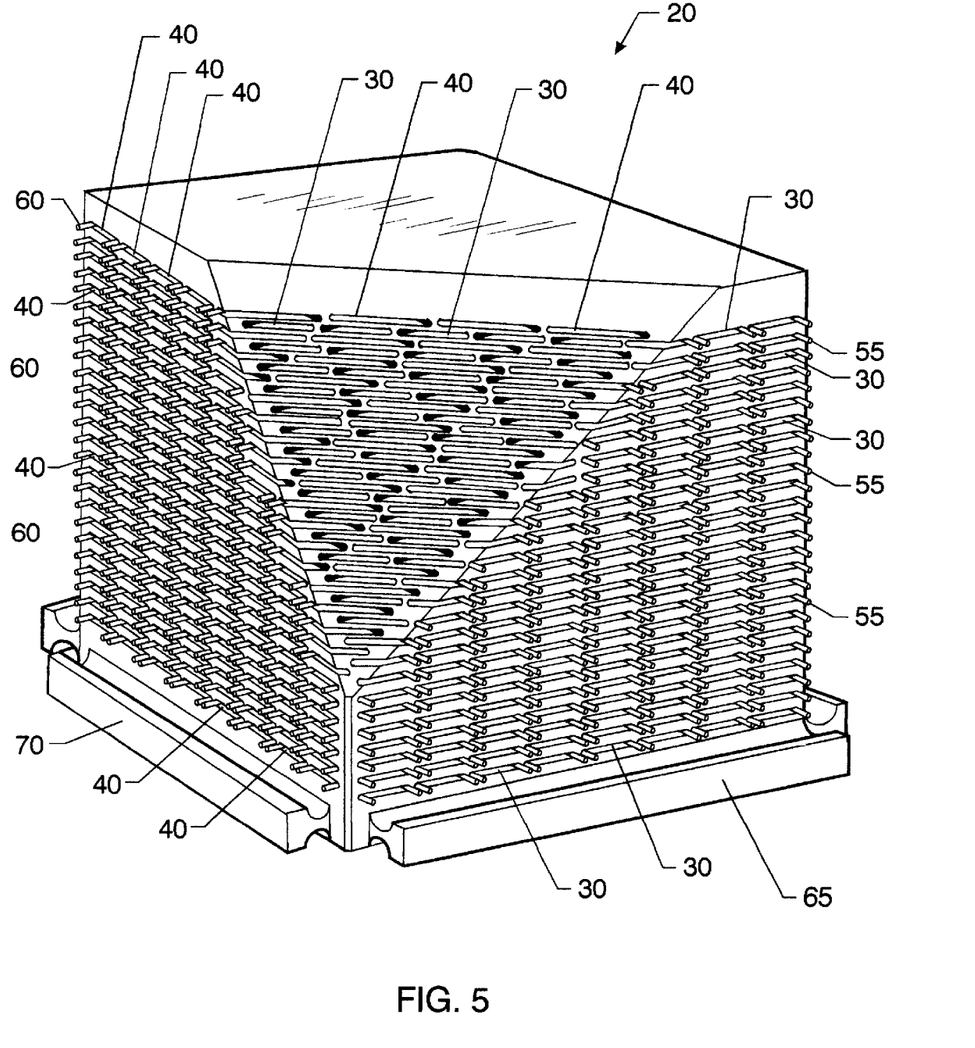
FIG. 5 is a perspective view with a cutaway section showing the interior alternating rows of a preferred embodiment of the monolithic ionically conductive core of the present invention.

FIG. 5 shows a preferred embodiment where a first electrically conductive material 55 is disposed within and protrudes from the first set of coated passages 30 and a second electrically conductive material 60 is disposed within and protrudes from the second set of coated passages 40. The first electrically conductive material and the second electrically conductive material serve as current collectors for the monolithic mass and energy transfer cell. Although the first electrically conductive material and the second electrically conductive material are depicted as protruding from the first and second sets of coated passages, this is not a requirement. Moreover, the cell will function without the electrically conductive material, provided a porous, electrically conductive coating is disposed within the passages.

The first electrically conductive material must be compatible with the first porous, electrically conductive coating. The first electrically conductive material is preferably prepared from nickel-dispersed doped-zirconia, platinum, palladium or gold and in particular, nickel-dispersed doped-zirconia. The second electrically conductive material is preferably prepared from lanthanum manganite, strontium-doped lanthanum manganite, and a dispersed noble metal. Most preferably, the second electrically conductive material is strontium-doped lanthanum manganite. The first and second electrically conductive materials are preferably shaped into rods which are disposed within each respective set of passages and sintered into place by employing high temperature. As an alternative, the electrically conductive material is a mesh which is inserted into the appropriate set of passages. Preferably, at least one form of the electrically conductive material (for example, a rod or mesh) is disposed within and protrudes from each passage. For example, if the electrically conductive material is shaped into a rod, two rods are disposed within and protrude from each passage. Since the electrically conductive material serves as a current collector, it becomes a part of the external electric circuit.

Figure 6:
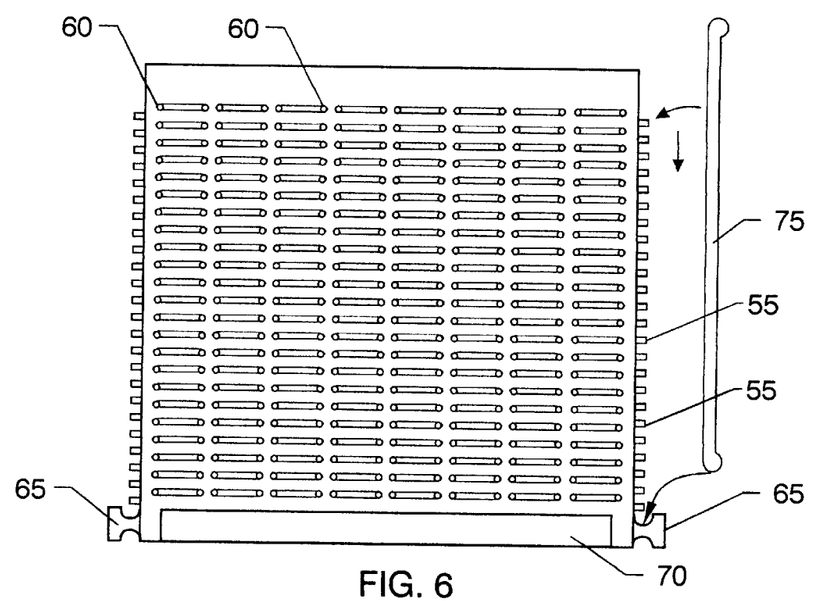
FIG. 6 is a side view of a preferred embodiment showing the external electric circuit of the present invention in electrical contact with the monolithic ionically conductive core.

FIG. 5 shows a first interlocking channel 65 and a second interlocking channel 70 protruding from the outer surface of the monolithic ionically conductive core 20. These interlocking channels are cast as a unibody piece of the monolithic ionically conductive core. The advantage to this design is there is no thermal mismatch between the interlocking channel and the monolithic ionically conductive core, which typically occurs at the adhesive bond layer. Although the interlocking channels are shown in their preferred configuration, where they protrude from the bottom of the monolithic ionically conductive core, the interlocking channels may protrude from the side or the top of the monolithic ionically conductive core as well. The interlocking channels are configured to allow for connecting two or more monolithic mass and energy transfer cells together by nesting the interlocking channel of a first monolithic mass and energy transfer cell into the interlocking channel of a second and many more monolithic mass and energy transfer cells to form an array. When this is done, the first set of passages must be properly matched to the first set of passages of the next monolithic mass and energy transfer cell to prevent shorting of the cell array. This is easy to achieve because the first set of passages are in a nonparallel relationship with the second set of passages. As a result, the passages are offset from each other. This is shown in the cutaway portion of FIG. 5. The second function of the interlocking channels is shown in FIG. 6. The first interlocking channel 65 is used as a support for the first electrically conductive perforated plate 75 which is a part of the external electric circuit.

The external electric circuit comprises any external circuitry known to those skilled in the art. For example, a wire may be contacted with the porous, electrically conductive coating which has been extended to the outer surface of the monolithic ionically conductive cell or the wire may be contacted with the electrically conductive material disposed within each set of passages. A preferred embodiment for the external electric circuit is shown in FIG. 6. The external electric circuit comprises a first electrically conductive perforated plate 75 and a second electrically conductive perforated plate (not shown), wherein the first electrically conductive perforated plate 75 is supported by the first interlocking channel 65 wherein the first electrically conductive perforated plate 75 is in electrical contact with the first electrically conductive material 55 and the second electrically conductive perforated plate is in electrical contact with the second electrically conductive material 60. The first electrically conductive perforated plate should not come into contact with the second electrically conductive perforated plate or the cell will short out.

Figure 7:
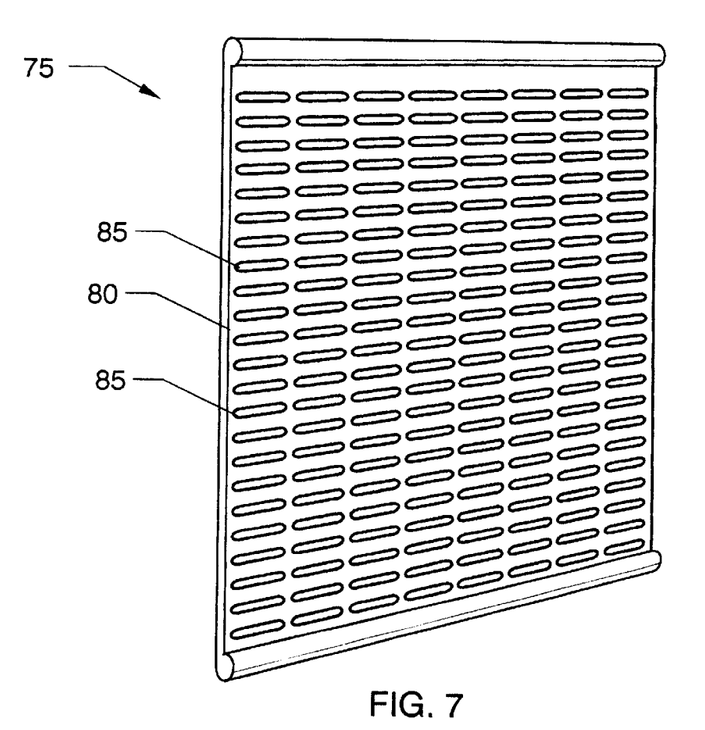
FIG. 7 is a perspective view of the electrically conductive perforated plate of the present invention.

The first electrically conductive perforated plate 75 is shown in detail in FIG. 7. The first electrically conductive perforated plate 75 comprises an electrically conductive plate 80 having perforations 85 which match the first entrance surface and the first exit surface of the monolithic ionically conductive core. The electrically conductive plate is comprised of the same electrically conductive material which is disposed in and protruding from the coated passage. For example, if the first set of passages has a strontium-doped lanthanum manganite rod disposed within and protruding from the first set of passages, the first electrically conductive perforated plate is comprised of strontium-doped lanthanum manganite. Alternatively, the second electrically conductive perforated plate is prepared from the same material as the second electrically conductive material disposed within and protruding from the second set of coated passages. The perforations match the second entrance surface and the second exit surface of the monolithic ionically conductive core.

The following examples illustrate the preparation of the monolithic mass and energy transfer cell. These examples are merely illustrative and intended to enable those skilled in the art to practice the invention in all of the embodiments flowing therefrom, and do not in any way limit the scope of the invention as defined by the claims.

EXAMPLES

Example 1

A monolithic oxygen ion conductive ceramic core was gel cast using the following process: 2.6 grams of DARVAN 821A, an ammonium polyacrylate solution, commercially available from R. T. Vanderbilt was mixed with 48.1 grams of deionized water to form a water/dispersant mixture. 10.9 grams of methacrylamide and 1.8 grams of methylenebisacrylamide were added to the water/dispersant mixture and milled for approximately one-half hour on a roller mill. After milling, 201.7 grams of HSY 8.0, a mixture of zirconium oxide, and hafnium oxide, commercially a mixture of zirconium, yttrium, and hafnium oxide, which is available from Daichi Chemical of Japan, was added to the milled mixture and remilled for approximately two hours. The particle size of the mixture was checked. The milled mixture was stirred and 20 drops/100 mL of slurry of tetramethylethylenediamine and 20 drops/100 mL of slurry of ammonium persulfate were added under constant stirring. The mixture was immediately poured into a mold containing rods placed in an orthogonal relationship with one another. The mixture was allowed to stand for approximately two hours. After the mixture had set, the mold and rods were removed to yield a monolithic oxygen ion conductive ceramic core having a first set of passages and a second set of passages.

Example 2

A monolithic mass and energy transfer cell is prepared from the monolithic oxygen ion conductive ceramic core of Example 1. A first porous electrically conductive coating is disposed within a first set of passages. The choice of the set of passages is arbitrary however, the set of passages must all enter the core from the same side and extend from the top of the core to the bottom of the core. The composition of the first porous electrically conductive coating is either: nickel-dispersed doped-zirconia, platinum, palladium or gold. This coating is applied using standard methods known to those skilled in the art such as dip coating, sputtering or vapor deposition. The coating is applied to cover the interior of the counterflow passages and may cover the outer surfaces where the first set of counterflow passages enter and exit the monolithic oxygen ion conductive ceramic core. A second porous electrically conductive coating is prepared from either: lanthanum manganite, strontium-doped lanthanum manganite, or a dispersed noble metal and is applied to the second set of passages using the techniques mentioned previously. A solid rod of the same material as that which is used to prepare the first porous electrically conductive coating is placed into the first set of passages. The length of the rod is slightly longer than the length of the passage in the core to allow for a slight extension of the rod beyond the core. Similarly, a solid rod of the same material as that which is used to prepare the second porous electrically conductive coating is placed into the second set of passages and protrudes therefrom. The core is then fired to sinter the rods into the passages.

A first perforated plate is formed from the same material used for the first porous, electrically conductive coating. For example, if a nickel-dispersed zirconia coating is used to coat the first set of passages, then the first perforated plate is formed from nickel-dispersed zirconia. The first perforated plate is then placed into the first interlocking channel and the perforations in the plate are aligned with the passage openings on the outer surface of the core. The perforated plate is also positioned to make electrical contact with the rods protruding from the first set of passages. A second perforated plate is made of a material to match the second porous, electrically conducting coating used to coat the second set of passages. This second perforated plate is placed into the second interlocking channel located in front of the second set of channels. The first perforated plate does not come into contact with the second perforated plate. The circuit is completed using standard wiring techniques known to those skilled in the art.

What is claimed as new and desired to be secured by Letters Patent of the United States is:

1. A monolithic mass and energy transfer cell comprising:
    a monolithic ionically conductive core having an outer surface including a first entrance surface and a first exit surface spaced apart from the first entrance surface, a first set of passages therebetween; and a second entrance surface and a second exit surface spaced apart from the second entrance surface, a second set of passages therebetween wherein the first set of passages are in a non-parallel relationship with the second set of passages and wherein the monolithic ionically conductive core is a single unit that does not require bonding between the first set of passages and the second set of passages;
    a first porous, electrically conductive coating disposed within the first set of passages;
    a second porous, electrically conductive coating disposed within the second set of passages; and
    an external electric circuit in electrical contact with the monolithic ionically conductive core.

2. A monolithic mass and energy transfer cell according to claim 1, further comprising a first electrically conductive material disposed within the first set of coated passages and a second electrically conductive material disposed within the second set of coated passages.

3. A monolithic mass and energy transfer cell according to claim 2, wherein the first electrically conductive material protrudes from the first set of coated passages and the second electrically conductive material protrudes from the second set of coated passages.

4. A monolithic mass and energy transfer cell according to claim 2, wherein the first electrically conductive material is selected from the group consisting of: nickel-dispersed doped-zirconia, platinum, palladium and gold; and the second electrically conductive material is selected from the group consisting of: lanthanum manganite, strontium-doped lanthanum manganite, and a dispersed noble metal.

5. A monolithic mass and energy transfer cell according to claim 1, wherein the first set of passages and the second set of passages have a shape selected from the group consisting of: rectangular, square, triangular, circular and elliptical.

6. A monolithic mass and energy transfer cell according to claim 5, wherein the first set of passages and the second set of passages have a rectangular shape.

7. A monolithic mass and energy transfer cell according to claim 1, wherein the non-parallel relationship is selected from the group consisting of: orthogonal, hexagonal, and radial.

8. A monolithic mass and energy transfer cell according to claim 7, wherein the non-parallel relationship is orthogonal.

9. A monolithic mass and energy transfer cell according to claim 1, wherein the first porous, electrically conductive coating is selected from the group consisting of: nickel-dispersed doped-zirconia, platinum, palladium and gold.

10. A monolithic mass and energy transfer cell according to claim 9, wherein the first porous, electrically conductive coating is comprised of nickel-dispersed doped-zirconia.

11. A monolithic mass and energy transfer cell according to claim 1, wherein the second porous, electrically conductive coating is selected from the group consisting of: lanthanum manganite, strontium-doped lanthanum manganite, and a dispersed noble metal.

12. A monolithic mass and energy transfer cell according to claim 11, wherein the second porous, electrically conductive coating is comprised of strontium-doped lanthanum manganite.

13. A monolithic mass and energy transfer cell comprising:
    a monolithic ionically conductive core having an outer surface including a first entrance surface and a first exit surface spaced apart from the first entrance surface, a first set of passages therebetween: and a second entrance surface and a second exit surface spaced apart from the second entrance surface, a second set of passages therebetween wherein the first set of passages are in a non-parallel relationship with the second set of passages;
    a first interlocking channel and a second interlocking channel wherein each interlocking channel is a unibody piece of the monolithic ionically conductive core and each interlocking channel protrudes from the outer surface of the monolithic ionically conductive core and wherein each interlocking channel is configured to allow for connecting at least two monolithic mass and energy transfer cells together;
    a first porous, electrically conductive coating disposed within the first set of passages;
    a first electrically conductive material disposed within the first set of coated passages;
    a second porous, electrically conductive coating disposed within the second set of passages;

a second electrically conductive material disposed within the second set of coated passages; and an external electric circuit in electrical contact with the monolithic ionically conductive core.

14. A monolithic mass and energy transfer cell according to claim 13, wherein the external electric circuit comprises a first electrically conductive perforated plate, supported by the first interlocking channel, wherein the first electrically conductive perforated plate is in electrical contact with the first electrically conductive material; and a second electrically conductive perforated plate, supported by the second interlocking channel, wherein the second electrically conductive perforated plate is in electrical contact with the second electrically conductive material.

15. A monolithic mass and energy transfer cell according to claim 14, wherein the monolithic ionically conductive core comprises an oxygen ion conductive ceramic.

16. A monolithic mass and energy transfer cell according to claim 15, wherein the oxygen ion conductive ceramic is selected from the group consisting of: yttria-doped zirconia, rare earth-doped cerium oxide, and rare earth-doped bismuth oxide.

17. A monolithic mass and energy transfer cell according to claim 16, wherein the oxygen ion conductive ceramic is ytrria-doped zirconia.

18. A monolithic mass and energy transfer cell comprising:

a monolithic ionically conductive core having an outer surface including a first entrance surface and a first exit surface spaced apart from the first entrance surface, a first set of passages therebetween wherein the first set of passages taper from the first entrance surface to the first exit surface; and a second entrance surface and a second exit surface spaced apart from the second entrance surface, a second set of passages therebetween wherein the second set of passages taper from the second entrance surface to the second exit surface wherein the first set of passages are in a non-parallel relationship with the second set of passages;

a first porous, electrically conductive coating disposed within the first set of passages;

a second porous, electrically conductive coating disposed within the second set of passages; and an external electric circuit in electrical contact with the monolithic ionically conductive core.

19. A monolithic mass and energy transfer cell comprising:

a monolithic ionically conductive core having an outer surface including a first entrance surface and a first exit surface spaced apart from the first entrance surface, a first set of passages therebetween wherein the first set of passages taper from the first entrance surface to the first exit surface and wherein the first set of passages has a rectangular shape; and a second entrance surface and a second exit surface spaced apart from the second entrance surface, a second set of passages therebetween wherein the second set of passages taper from the second entrance surface to the second exit surface and wherein the second set of passages has a rectangular shape; wherein the first set of passages are in a non-parallel relationship with the second set of passages;

a first porous, electrically conductive coating disposed within the first set of passages;

a second porous, electrically conductive coating disposed within the second set of passages; and an external electric circuit in electrical contact with the monolithic ionically conductive core.

20. A monolithic ionically conductive core having an outer surface including a first entrance surface and a first exit surface spaced apart from the first entrance surface, a first set of passages therebetween; and a second entrance surface and a second exit surface spaced apart from the second entrance surface, a second set of passages therebtween wherein the first set of passages are in a non-parallel relationship with the second set of passages and wherein the monolithic ionically conductive core is a single unit that does not require bonding between the first set of passages and the second set of passages.

* * * * *